United States Patent [19]

Beckman

[11] 4,162,693
[45] Jul. 31, 1979

[54] REVERSIBLE SHIRRED CASING AND METHOD FOR PRODUCING IT

[75] Inventor: John H. Beckman, Downers Grove, Ill.

[73] Assignee: Union Carbide Corporation, New York, N.Y.

[21] Appl. No.: 870,198

[22] Filed: Jan. 17, 1978

[51] Int. Cl.² .............................................. A22C 13/00
[52] U.S. Cl. .................................. 138/118.1; 426/138
[58] Field of Search .......................... 138/118.1; 17/49; 426/105, 135, 140, 138

[56] References Cited

U.S. PATENT DOCUMENTS

| 3,378,379 | 4/1968 | Shiner et al. | 138/118.1 |
| 3,892,869 | 7/1975 | Sheridan et al. | 138/118.1 |

Primary Examiner—Richard E. Aegerter
Assistant Examiner—Willis Little
Attorney, Agent, or Firm—Cornelius F. O'Brien

[57] ABSTRACT

A shirred casing, and method for producing it, having a portion at the first end of the casing deshirred and disposed within the bore of the casing with the deshirred casing proximal the second end of the shirred casing gathered and closed by externally disposed closure means.

15 Claims, 2 Drawing Figures

REVERSIBLE SHIRRED CASING AND METHOD FOR PRODUCING IT

FIELD OF THE INVENTION

The invention relates to a tubular shirred casing having one end deshirred and disposed within the bore of the casing and extending to the opposite end of the shirred casing where the deshirred casing is externally closed thereby producing a shirred tubular casing that will turn inside out when being stuffed.

BACKGROUND OF THE INVENTION

There are a large number of different types of processed food products such as frankfurters, bologna, salami, liverwurst, cheese rolls, turkey rolls, and the like manufactured throughout the world from a wide range of recipes and using many different types of processing conditions. A common feature of most categories of processed food products, particularly meat products, is that the mixture of ingredients of which the processed food product is prepared, commonly called an "emulsion", is stuffed into a casing. The food product can be processed while encased in the casing, and in many cases is then stored in the casing.

Casings most generally used are synthetic casings that may be of several different types and sizes depending on the category of food product to be prepared. In general, synthetic casings are supported or unsupported materials with the supported type, commonly called "fibrous food casing", utilized in the preparation of larger sizes of products such as turkey rolls. These casings can also be used to make somewhat smaller products such as chubs, e.g., sausages, which vary in diameter between 1 to 2 inches. Fibrous casing consists of a fibrous web, usually a non-woven paper, formed into a seamless tube, impregnated with viscose which is regenerated in situ.

Since there are so many differences in recipes for making processed food products, such as sausages, and such different modes of processing the different products, it is difficult to provide a casing that is acceptable for all uses. For example, a category of sausages is typified by liver sausage which is moist, relatively soft, has a substantially high fat content and is cooked, usually in hot water or steam, by the manufacturer. In this type of sausage, moisture must be protected against oxidation which causes undesirable discoloration. A suitable casing should, therefore, be impermeable to moisture and have a low rate of oxygen transmission. Thus various casings having a suitable coating adhered to the surface thereof are commercially available for use in such applications. Food casings such as, for example, disclosed in U.S. Pat. No. 2,961,323 are coated with materials, such as a polyvinylidene chloride copolymer, which are substantially impermeable to moisture and have low oxygen and gas transmission characteristics.

Cellulosic food casing used in the sausage industry are multifunctional in that they can be used as containers during the processing of the product and as protective wrapping for the finished product. The casing is often removed from the sausage after processing and the sausage sliced and repacked into smaller units. When the casing is removed from the meat mass, there is frequently a tendency for some meat to adhere to the casing and be torn from the sausage with the casing, thereby causing surface marring of the sausage. The marring may range from minor scuffing to severe scarring depending upon the type of meat product and conditions of processing and peeling. Thus in the use of this type casing, it may be advantageous to have an internally applied coating to the casing that will enable the casing to be easily removed from the meat mass encased therein.

In other applications, it may be desirable to have a different type of coating applied to the inner surface of a fibrous casing. For example, in stuffing sausage emulsion containing a substantially high fat content into a cellulose hydrate casing, it may be desirable to have a vinylidene resin coating applied on the inner surface of the casing so that when the sausage emulsion is processed, the outer surface of the casing after being wet can dry and shrink thus encasing the sausage properly to provide a plump, attractively shaped product.

For some applications, it may be desirable to have the internal or external surface of a casing coated with a layer such as a moisture-proof layer of polyvinyl chloride, polyolefins and substituted polyolefins as well as vinyls, polyesters, nylons, and suitable copolymers of the above. There are many methods presently available for internally coating a tubing as, for example, the "slugging" technique described in U.S. Pat. No. 3,378,379. There is also substantial knowledge available in the external coating art to permit the use of various coating materials to be applied to the external surface of tubing. It is known in the art that coated flexible tubings, such as internally or externally coated casings, can be turned inside out prior to stuffing the tubings with product.

German Patent Application No. 2,254,731 discloses another technique for stuffing shirred casings inside out so that the external surface of the shirred casings becomes the internal surface of the stuffed articles. Specifically, this application discloses a shirred casing in which one end of the casing is deshirred, closed and fed through the bore of the casing such that the closure means end up within the bore of the deshirred portion of the casing proximal the opposite end of the shirred casing. The double-walled casing so produced is thereby employed with conventional stuffing apparatus whereupon the casing is turned inside out during stuffing.

It is an object of the present invention to provide a shirred tubular casing having an internally disposed deshirred casing in which one end is an integral part of one end of the shirred casing and the opposite end of the deshirred casing being externally closed and disposed proximate the opposite end of the shirred casing.

Another object of the present invention is to provide a shirred tubular casing having an inturned disposed deshirred portion closed at one end and which is adaptable for being stuffed inside out in a manner such that the means used for closing the deshirred casing is on the outside of the casing.

Another object of the present invention is to provide a shirred tubular casing having an internally disposed deshirred casing portion that will easily turn inside out when being stuffed.

Another object of the present invention is to provide a process for producing a shirred tubular casing having a deshirred portion of the casing disposed within said casing and wherein said deshirred casing comprises an open end integrally part of one end of the shirred casing and closed end proximal the opposite end of the shirred casing with the closure means disposed outside the deshirred casing.

SUMMARY OF THE INVENTION

The invention basically relates to a shirred tubular casing having a portion of a first end of the casing deshirred and disposed within the bore of the casing with the deshirred casing extending to the vicinity of a second end of the shirred tubular casing, said deshirred casing disposed at the second end of the shirred casing being gathered and closed by closure means disposed external of the deshirred casing such that the inner deshirred casing has an open end which is integral with the first end of the shirred tubular casing and a closed end at the second end of the shirred tubular casing, said closed end comprising closure means disposed outside of the deshirred casing so that material fed into the open end of the inner deshirred casing down to its closed end will not contact the closure means employed for closing the end of the deshirred casing.

The invention also relates to a process for producing a shirred tubular casing having as an integral part an internally disposed deshirred portion having an open end integral with one end of the shirred casing and a closed end proximal the opposite end of the shirred casing comprising the steps of:

(a) shirring a length of flexible casing to form a shirred casing stick;

(b) deshirring a portion of the shirred casing stick at one end and inturning it into and drawing or pushing it through the bore of the shirred stick so that the deshirred end extends out through the opposite end of the shirred casing stick; and (c) gathering the deshirred casing extending out through the shirred casing stick and applying an external closure to said gathered end.

If desirable, the externally closed end of the deshirred casing may be inturned into the shirred casing so as to be disposed within the bore of the shirred casing stick.

The closure means suitable for use in this invention are the conventional U-shaped clips, wire closures, tape closures, string closures, and the like.

A primary feature of the present invention is that the closure means be applied external to the gathered deshirred end of the casing so that it will not contact the product or material being fed into the casing. This is of primary importance when the product is food since if the closure means was to contact the food product, it could possibly cause contamination or other detrimental effect to the food. Additionally, when a casing with an internally clipped closed end is removed from the meat product, it would leave a cavity that would cause waste of the meat product and detract from the product appearance. Thus contrary to the prior art, the closure means applied in accordance with this invention would be on the outside of the casing when the casing is initially turned inside out during the stuffing operation.

The tubing or tubular food casings suitable for use in preparing shirred and compressed tubular casing of the present invention may be flexible, seamless tubing formed of regenerated cellulose, cellulose ethers such as the ethyl, propyl, hydroxy, alkyl and like ethers, proteins, carbohydrates, collagens, alginates, starches as well as other synthetic or artificial materials. Tubings reinforced with fibers such as, for example, those employed in the production of yoshino paper, rice paper and the like, hemp, rayon, flax, nylon, polyethylene terephthalate and the like, are most advantageously employed in applications requiring large diameter tubular food casings.

The tubular casings can be made by any known process such as, for example, by the cuprammonium, deacetylation of cellulose acetate, viscose, denitration of cellulose nitrate processes or extrusion of appropriate compositions. Tubular casings reinforced with fibers can be made by the method and apparatus described, for example, in U.S. Pat. Nos. 2,105,273, 2,144,889, 2,910,380, 3,135,613 and 3,433,663.

Coating materials suitable for use as coatings with tubular food casings are well known and may be prepared, for example, from polyvinylidene chloride resin copolymers, polyethylene and other polyolefin resins, polyester resins, nylon, polyurethane resins and suitable combinations thereof. The coating is applied to the internal or external surface of the casing whereupon the casing can then be turned inside out during the stuffing operation.

The use and type of a primer on the surface of casing employed prior to application of the coating or applying the coating directly to the surface of the casing will depend on the type of coating to be employed, the degree of adhesion required and the service requirements for the casing. It is known, for example, that various cationic thermosetting resins are advantageously employed as primers for enhancing adhesion of certain polyvinylidene chloride copolymer coatings to cellulosic casing surfaces. Exemplary of polyvinylidene chloride copolymer resin coatings advantageously employed with tubular food casings and the method of application may be found, for example, in the disclosures of U.S. Pat. Nos. 2,961,323, 3,328,330 and 3,369,911.

Shirred tubular casing sticks may be prepared by shirring tubular casing employing the conventional shirring machines and methods as disclosed, for example, in U.S. Pat. Nos. 2,983,949, 2,984,574 and 3,397,069.

The shirred tubular casing sticks having an integral deshirred casing portion disposed within the bore of shirred casing sticks in accordance with this invention can be used on automatic machines which have been developed for stuffing shirred food casings with food emulsions to produce such products as sausages, turkey rolls, cheese rolls, or the like, on a continuous basis. The extension of the casing during the stuffing operation of the machine requires the casing to be especially strong and resistant to tearing. In addition, the casing stick is required to have an end closure so that the shirred casing stick can merely be placed on the stuffing horn of a stuffing machine and filled with food emulsion without further handling by the machine operator for convenience and to ensure that none of the food emulsion escapes from the casing. The discharge end of the stuffing horn is disposed within the open end of the casing bore containing the inturned, inverted deshirred length of casing. Food emulsion is then dispensed from the stuffing horn to fill the inverted casing into a predetermined length which can thereafter be suitably processed, if necessary. By having the closure means disposed on the exterior of the gathered end portion of the inturned deshirred casing in accordance with this invention, the closure means will not come in contact with the product, such as meat emulsion, that is fed into the casing. This could possibly prevent contamination or spoilage of the product within the casing and thereby possibly result in a longer shelf-life for the stuffed product.

Figure 1:
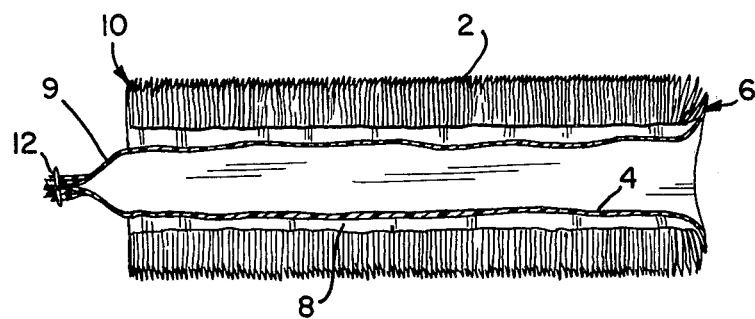
FIG. 1 is a cross-sectional view of a tubular shirred casing stick having an internal deshirred casing portion in accordance with this invention.

Referring in detail to FIG. 1, there is shown a hollow stick of tubular casing 2 having a deshirred length 4 at one end 6 inturned into bore 8 and extended through the bore 8 out through the opposite end 10 of the casing 2. The end 9 of the deshirred length 4 extending out of end 10 is shown gathered and closed with an externally disposed metal clip 12. As evident from FIG. 1, when the casing 2 is positioned on a stuffing horn of a conventional stuffing apparatus with end 6 slid onto the stuffing horn, the casing can be efficiently and effectively stuffed inside out.

Figure 2:
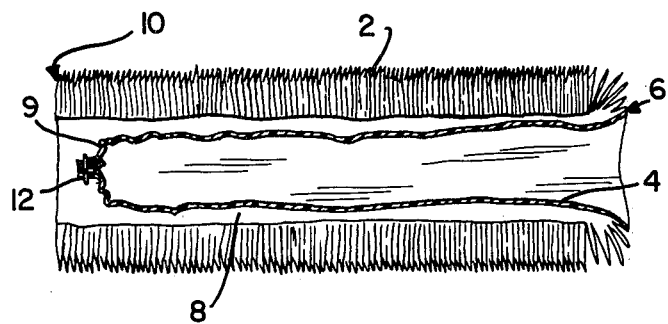
FIG. 2 is a cross-sectional view of the shirred casing stick of FIG. 1 having the closed end of the deshirred casing portion tucked into the bore of the casing.

FIG. 2 illustrates the same shirred stick of tubular casing as in FIG. 1 and has identical parts identified with the same reference numbers as in FIG. 1. The only difference between the shirred stick of tubular casing of FIG. 1 and that shown in FIG. 2 is that in FIG. 2, the gathered and closed end 9 is shown pushed back into the bore 8 of shirred casing 21 so that the closed end 9 is disposed completely within the bore 8.

The invention being thus described, it will be obvious that the same may be varied in many ways. Such variations are not to be regarded as a departure from the spirit and scope of the invention, but all such modifications are intended to be included within the scope of the following claims.

What is claimed is:

1. A shirred tubular casing having a portion of a first end of the casing deshirred and disposed within the bore of the casing with the deshirred casing extending to the vicinity of a second end of the shirred tubular casing, said deshirred casing proximal the second end of the shirred casing being gathered and closed by closure means disposed external of the deshirred casing such that the inner deshirred casing has an open end which is integral with the first end of the shirred tubular casing and a closed end at the second end of the shirred tubular casing, said closed end comprising closure means disposed outside of the deshirred casing so that material fed into the open end of the inner deshirred casing down to its second end will not contact the closure means employed for closing the end of the deshirred casing and when the material is continuously fed into the open end through the shirred tubular casing and out the closed end of the shirred casing, the shirred casing will turn inside out so that the external surface of the shirred casing will contact the material fed into the casing.

2. The shirred tubular casing of claim 1 wherein the casing is a coated fibrous casing.

3. The shirred tubular casing of claim 1 wherein the casing is a coated cellulose casing.

4. The shirred tubular casing of claim 1 wherein the closed end of the deshirred casing extends beyond the second end of shirred casing.

5. The shirred tubular casing of claim 4 wherein the casing is a coated fibrous casing.

6. The shirred tubular casing of claim 4 wherein the casing is a coated cellulose casing.

7. The shirred tubular casing of claim 1 wherein the closed end of the deshirred casing is disposed within the bore of the shirred casing.

8. The shirred tubular casing of claim 7 wherein the casing is a coated fibrous casing.

9. The shirred tubular casing of claim 7 wherein the casing is a coated cellulose casing.

10. A method for producing a shirred tubular casing having as an integral part an internally disposed deshirred portion having an open end integral with one end of the shirred casing and a closed end proximal the opposite end of the shirred casing and when material is fed into the open end of the shirred tubular casing, the shirred casing will turn inside out so that the external surface of the shirred casing will contact the material fed into the casing, comprising the steps of:
  (a) shirring a length of flexible casing to form a shirred casing stick;
  (b) deshirring a portion of the shirred casing stick at one end and inturning it into and drawing it through the bore of the shirred stick so that the deshirred end extends out through the opposite end of the shirred casing stick; and
  (c) gathering the deshirred casing extending out through the shirred casing and applying an external closure to said gathered end.

11. The method of claim 10 wherein the following step is added:
  (d) inturning the closed gathered end of the deshirred casing into the bore of the shirred casing.

12. The method of claim 10 wherein the casing is a coated fibrous casing.

13. The method of claim 10 wherein the casing is a coated cellulose casing.

14. The method of claim 11 wherein the casing is a coated fibrous casing.

15. The method of claim 11 wherein the casing is a coated cellulose casing.

* * * * *

Disclaimer 4,162,693.—*John Heller Beckman*, Downers Grove, Ill. REVERSIBLE SHIRRED CASING AND METHOD FOR PRODUCING IT. Patent dated July 31, 1979. Disclaimer filed May 9, 1983, by the assignee, *Union Carbide Corp.*

Hereby enters this disclaimer to the entire term of said patent.

[*Official Gazette July 5, 1983.*]